United States Patent
Sriram et al.

(10) Patent No.: US 10,177,434 B1
(45) Date of Patent: Jan. 8, 2019

(54) PARABOLIC REFLECTOR COMBINED WITH PHASED ARRAY FEED FOR LONG RANGE COMMUNICATION

(71) Applicant: X Development LLC, Mountain View, CA (US)

(72) Inventors: Sundararajan Sriram, Sunnyvale, CA (US); Simon Scott, Berkeley, CA (US); Jeffrey M. Gilbert, Los Altos, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/852,775

(22) Filed: Dec. 22, 2017

Related U.S. Application Data (60) Provisional application No. 62/438,642, filed on Dec. 23, 2016.

(51) Int. Cl.
| | | |
|---|---|---|
| *H01Q 19/10* | (2006.01) | |
| *H01Q 1/12* | (2006.01) | |
| *H04W 72/08* | (2009.01) | |
| *H01Q 3/20* | (2006.01) | |
| *H01Q 3/32* | (2006.01) | |
| *H01Q 21/22* | (2006.01) | |

(52) U.S. Cl.
CPC ............ *H01Q 1/1264* (2013.01); *H01Q 3/20* (2013.01); *H01Q 3/32* (2013.01); *H01Q 19/10* (2013.01); *H01Q 21/22* (2013.01); *H04W 72/082* (2013.01)

(58) Field of Classification Search
CPC .......... H01Q 1/1264; H01Q 3/20; H01Q 3/32; H01Q 19/10; H01Q 21/22; H04W 72/082
USPC ........................................................ 455/63.4
See application file for complete search history.

(56) References Cited

U.S. PATENT DOCUMENTS

| | | | | |
|---|---|---|---|---|
| 3,757,326 | A * | 9/1973 | White | G01S 13/685 342/148 |
| 4,195,301 | A * | 3/1980 | Conroy | H01Q 9/0407 343/700 MS |
| 5,689,275 | A * | 11/1997 | Moore | H01Q 3/2676 343/772 |
| 5,983,071 | A * | 11/1999 | Gagnon | H01Q 3/08 342/359 |
| 6,034,634 | A * | 3/2000 | Karlsson | H01Q 3/08 342/359 |
| 6,181,450 | B1 * | 1/2001 | Dishman | H04B 7/18521 370/281 |
| 6,271,953 | B1 * | 8/2001 | Dishman | H04B 10/118 398/129 |
| 6,295,034 | B1 * | 9/2001 | Brown | H01Q 3/2658 343/781 CA |
| 6,618,008 | B1 * | 9/2003 | Scholz | G01S 7/032 342/427 |

(Continued)

*Primary Examiner* — Hai V Nguyen
(74) *Attorney, Agent, or Firm* — Lerner, David, Littenberg, Krumholz & Mentlik, LLP (57) ABSTRACT

Aspects of the disclosure provide for an antenna system. The antenna system includes a main reflector, a phased array feed, and a mechanical steering system. The phased array feed is configured to receive and/or transmit signals reflected off the main reflector and to electronically steer a transmitted signal on a first axis. The main reflector and the phased array feed are both attached to the mechanical steering system, and the mechanical steering system is configured to move the transmitted signal along a second axis.

20 Claims, 10 Drawing Sheets

(56) References Cited

U.S. PATENT DOCUMENTS

| | | | | |
|---|---|---|---|---|
| 6,650,291 B1 * | 11/2003 | West | ............ | H01Q 3/46 342/371 |
| 6,756,866 B1 * | 6/2004 | Higgins | ............ | H01P 1/182 333/157 |
| 6,806,846 B1 * | 10/2004 | West | ............ | H01Q 15/02 343/700 MS |
| 6,819,285 B1 * | 11/2004 | Stockman | ............ | G01S 7/4021 342/123 |
| 7,133,001 B2 * | 11/2006 | Mrstik | ............ | H01Q 1/082 343/915 |
| 7,212,170 B1 * | 5/2007 | Dean | ............ | H01Q 3/04 343/754 |
| 7,472,409 B1 * | 12/2008 | Linton | ............ | H01Q 1/3275 342/354 |
| 7,839,349 B1 * | 11/2010 | West | ............ | H01Q 19/13 343/781 CA |
| 7,961,153 B2 * | 6/2011 | Haziza | ............ | H01Q 3/22 343/772 |
| 8,035,091 B2 * | 10/2011 | Daly | ............ | H01Q 15/147 250/504 R |
| 8,248,298 B2 * | 8/2012 | Lalezari | ............ | H01Q 21/24 342/120 |
| 9,257,752 B2 * | 2/2016 | Alexopoulos | ............ | H01Q 19/10 |
| 9,515,372 B2 * | 12/2016 | Chang | ............ | H01Q 1/1257 |
| 9,647,333 B2 * | 5/2017 | Lv | ............ | H01Q 15/14 |
| 10,038,252 B2 * | 7/2018 | West | ............ | H01Q 21/065 |
| 2002/0063657 A1 * | 5/2002 | Shuch | ............ | H01Q 3/26 342/362 |
| 2002/0167449 A1 * | 11/2002 | Frazita | ............ | H01Q 1/42 343/756 |
| 2005/0179615 A1 * | 8/2005 | Mrstik | ............ | H01Q 1/082 343/915 |
| 2009/0058747 A1 * | 3/2009 | Haziza | ............ | H01Q 3/22 343/772 |
| 2013/0321204 A1 * | 12/2013 | Zahavi | ............ | H01Q 3/08 342/368 |
| 2014/0313074 A1 * | 10/2014 | Chang | ............ | H04B 7/18523 342/352 |
| 2015/0123843 A1 * | 5/2015 | Lier | ............ | H04K 3/228 342/352 |
| 2015/0177376 A1 * | 6/2015 | Galletti | ............ | G01S 13/951 342/26 R |
| 2016/0172752 A1 * | 6/2016 | Amos | ............ | H01Q 25/007 343/761 |
| 2016/0372835 A1 * | 12/2016 | Toso | ............ | H01Q 19/192 |
| 2017/0054221 A1 * | 2/2017 | West | ............ | H01Q 21/065 |
| 2017/0214456 A1 * | 7/2017 | Ozaki | ............ | H01Q 3/18 |
| 2017/0222327 A1 * | 8/2017 | Retter | ............ | H01Q 1/48 |
| 2018/0067204 A1 * | 3/2018 | Frizzell | ............ | G01S 13/867 |
| 2018/0083357 A1 * | 3/2018 | Nicolls | ............ | H01Q 3/2658 |
| 2018/0131089 A1 * | 5/2018 | Yilmaz | ............ | H01Q 21/065 |
| 2018/0198214 A1 * | 7/2018 | Walker | ............ | H01Q 15/16 |

* cited by examiner

FIGURE 11

PARABOLIC REFLECTOR COMBINED WITH PHASED ARRAY FEED FOR LONG RANGE COMMUNICATION

CROSS-REFERENCE TO RELATED APPLICATIONS

The present application claims the benefit of the filing date of U.S. Provisional Patent Application No. 62/438,642 filed Dec. 23, 2016, the disclosure of which is hereby incorporated herein by reference.

BACKGROUND

Communication terminals may transmit and receive radio signals through space. In order to accomplish this, such terminals generally use acquisition and tracking systems to establish the radio link by pointing high gain radio antennas toward one another. For instance, a transmitting terminal may use a beacon radio signal to signal the receiving terminal, while the receiving terminal may use a radio signal strength indicator to locate the transmitting terminal. Steering mechanisms may maneuver the terminals to point their antennas towards each other and to track the antenna pointing once acquisition is established. A high degree of pointing accuracy may be required to ensure that the radio signal will be correctly received.

BRIEF SUMMARY

Aspects of the disclosure provide for an antenna system. The antenna system includes a main reflector, a phased array feed configured to receive or transmit signals off the main reflector and to electronically steer a transmitted signal on a first axis, and a mechanical steering system to which the main reflector and the phased array feed are attached. The mechanical steering system is configured to move the transmitted signal along a second axis.

In one example, the main reflector is a parabolic cylinder, the parabolic cylinder being linear in one dimension and a parabolic in a second dimension. In this example antenna system, the phased array feed is a linear phased array positioned along a linear focus of the main reflector. In another example, the first axis is vertical, and the second axis is horizontal.

Other example antenna systems also include a back reflector positioned proximal to the phased array feed on a side of the phased array feed opposite the main reflector. Optionally, the position of the back reflector relative to the main reflector remains fixed when the mechanical steering system moves the transmitted signal along the second axis. In a further example, the mechanical steering system of the antenna system includes a turntable configured to rotate about a turntable axis. In yet another example, the phased array feed is configured to remain stationary when the mechanical steering system moves the transmitted signal along the second axis.

In an additional example antenna system, the mechanical steering system includes one or more arms extending between the main reflector and the phased array feed. Optionally, the mechanical steering system includes one or more arms extending between the main reflector and the back reflector. In a further example, the antenna system also includes at least two additional feed elements, a first additional feed element being positioned on a first side of the phased array feed and a second additional feed element being positioned on a second side of the phased array feed opposite the first side. In some instances, the first and second additional feed elements are configured to receive a signal, and the antenna system is configured to adjust the antenna system based on the received signal in order to cause the received signal to be reflected onto the phased array feed more than onto the first and second addition feed elements. In other instances, the at least two additional feed elements comprises two linear phased arrays.

In yet another example, the main reflector is a first main reflector, and the phased array feed is a first phased array feed. This example antenna also includes a second main reflector positioned in alignment with the first main reflector and a second phased array feed positioned in alignment with the first phased array feed. Optionally, this antenna system also includes an insulating foam between the first phased array feed and the second phased array feed.

Other aspects of the disclosure provide for a method that includes determining, by one or more processors, a particular location with which to establish a communication channel; transmitting, by the one or more processors via an antenna system, a signal, the antenna system comprising a main reflector, a phased array feed, and a mechanical steering system; steering, by the one or more processors, the transmitted signal electronically along a first axis using a phased array feed and mechanically along a second axis using a mechanical steering system; and initiating, by the one or more processors, two-way communication between the antenna system and the particular location.

In one example, the phased array feed is a linear phased array positioned along a linear focus of the main reflector. In another example, the first axis is vertical, and the second axis is horizontal. In some instances, mechanically steering the transmitted signal includes controlling the mechanical steering system, the mechanical steering system comprising a turntable configured to rotate about a turntable axis or one or more arms extending between the main reflector and the phased array feed.

The example method optionally also includes adjusting, by the one or more processors, a position of the antenna system by receiving, via the phased array feed and one or more additional feed elements arranged proximal to the phased array feed, one or more signals; determining feed locations on the phased array feed and the one or more additional feed elements where the one or more signals is received; determining an adjustment based on the determined feed locations; and moving, using the mechanical steering system, the antenna system according to the determined adjustment.

DETAILED DESCRIPTION

Overview

The technology relates to an antenna system for long-range communication that combines the elements of a phased array feed and a reflector in a manner that allows for electronically steering the signal whilst achieving a high antenna gain required by long range wireless radio communications.

The antenna system includes a main reflector and a phased array feed. For example, the main reflector may be a reflective sheet of material that is bent into a parabolic shape. The focus of the main reflector may be at a distance from the vertex of the main reflector. The phased array feed may be arranged at the focus of the main reflector at the distance from the vertex of the main reflector. The phased array feed may be configured for electronic steering of the direction of a transmitted signal and/or a received signal on a first axis. The first axis may be vertical. The feed element may be any type of antenna such as (but not restricted to) patch antenna, waveguide antenna, or horn antenna.

The antenna system may be configured to rotate as a unit and thereby mechanically steer the direction of a transmitted signal and/or a received signal on a second axis. The second axis may be horizontal, for example, or otherwise perpendicular to the first axis. The phased array feed may rotate in place or may remain stationary while the main reflector rotates. The rotation of the main reflector steers the antenna system on the second axis, and the phased array feed may then electronically steer a transmitted signal and/or a received signal on the first axis. The desired signal steering direction is thus decomposed into the mechanical and electronic steering axes.

For receiving a signal, additional array feeds or feed elements may be arranged around the main phased array feed. These additional array feeds may be used to detect whether the signal is being reflected off the main reflector onto the main phased array feed and/or to the degree to which the signal is being reflected off the main reflector onto the main phased array feed. The additional array feeds or feed elements may be positioned to the left and to the right of the main phased array feed, forming a plane perpendicular to the vertex or axis of symmetry of the main reflector. When a received signal is detected mostly by one of the additional array feeds or feed elements rather than mostly by the main phased array feed, the position of the main reflector may be changed in order to focus the signal mostly on the main phased array feed such that the received signal is mostly detected by the main phased array feed.

The antenna system may be configured to simultaneously transmit and receive signal by including a transmitting phased array feed and reflector system arranged adjacent to a receiving phased array feed and reflector system. The receiver and the transmitter may optionally use different frequency bands in a Frequency Division Duplex mode. The antenna system may include a radio-frequency absorption foam at the boundary of the transmitting system and the receiving system to prevent interference with the transmitting and received signal.

Additionally, the antenna system may include a back reflector arranged on the side of the phased array feed opposite the main reflector. The back reflector may be curved to wrap around the phased feed array and direct the radio signal toward the main reflector. When the main reflector rotates, the back reflector may be configured to rotate with the main reflector so that the back reflector is always oriented towards or facing the main reflector.

Example Systems

Figure 1:
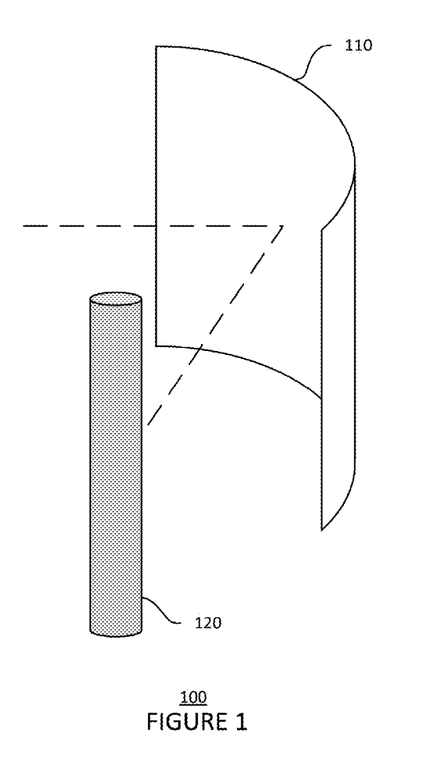
FIG. 1 is a perspective view of an example antenna system in accordance with aspects of the disclosure.
Figure 2:
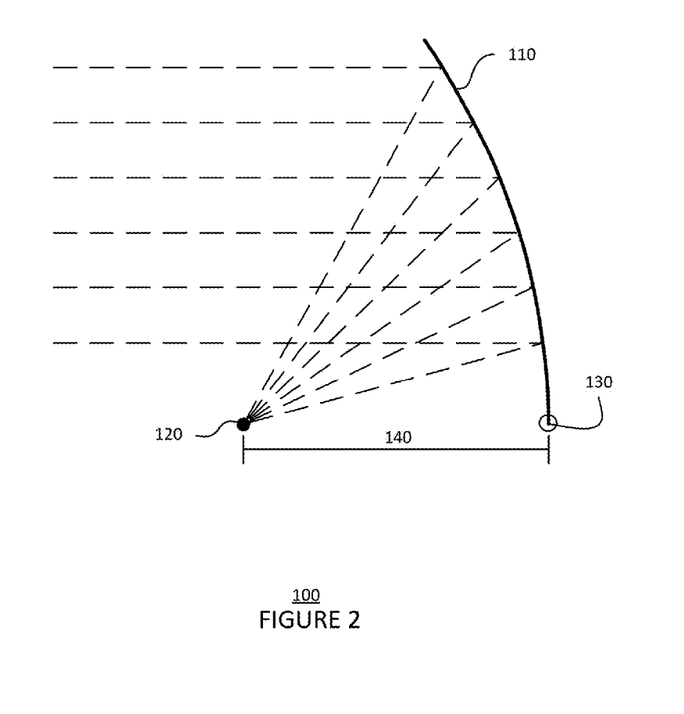
FIG. 2 is a top-down view of the example antenna system of FIG. 1 in accordance with aspects of the disclosure.

FIGS. 1 and 2 are pictorial diagrams of one embodiment of an example antenna system 100 that includes a main reflector 110 and a phased array feed 120. In one particular embodiment, the main reflector 110 may be a reflective sheet of material that is bent into a parabolic shape. Specifically, this main parabolic reflector 110 is a parabolic cylinder, which is parabolic in one dimension and linear in a second dimension such that the parabolic shape is formed on a plane perpendicular to the surface of the reflective sheet. In other implementations, the main reflector may be bent into another shape, such as a paraboloid, a spherical cylinder, a hemisphere, or other curved shape. Main parabolic reflector 110 is parabolic from the perspective of the top-down view illustrated in FIG. 2 with a vertex 130 marked by the circle. The focus of the main parabolic reflector 110 may be a line parallel to the surface of the parabolic reflector and at a distance 140 from the vertex 130 of the parabolic curve of the main parabolic reflector 110. The phased array feed 120 may be a linear array feed arranged parallel to the parabolic reflector along a linear focus at distance 140 from the vertex 130 of the main parabolic reflector 110. In one embodiment, the linear array feed 120 is configured for electronic steering of the direction of a transmitted signal and/or a received signal on a first axis. In one particular example, the first axis is a vertical axis.

With continued reference to FIGS. 1 and 2, the antenna system 100 is configured to mechanically steer the direction of a transmitted signal and/or a received signal on a second axis using a mechanical steering system. The second axis in this particular example is horizontal, but in other embodiments, the second axis may be another axis perpendicular to the first axis. A mechanical steering system may be included in the antenna system that is configured to move the main reflector and the phased array feed.

In other implementations, other combinations of mechanical and electronic steering may be used. For example, the antenna system 100 may be configured to electronically steer a transmitted signal and/or a received signal along both the first axis and the second axis in a same or similar manner as described above with respect to the first axis. In another example, the antenna system 100 may be configured to both mechanically and electronically steer a transmitted signal and/or a received signal along the first axis and/or both mechanically and electronically steer a transmitted signal and/or a received signal along the second axis. When using both mechanical and electronic steering, coarse steering may be performed using the mechanical steering, and fine steering may be performed using the electronic steering.

Figure 3:
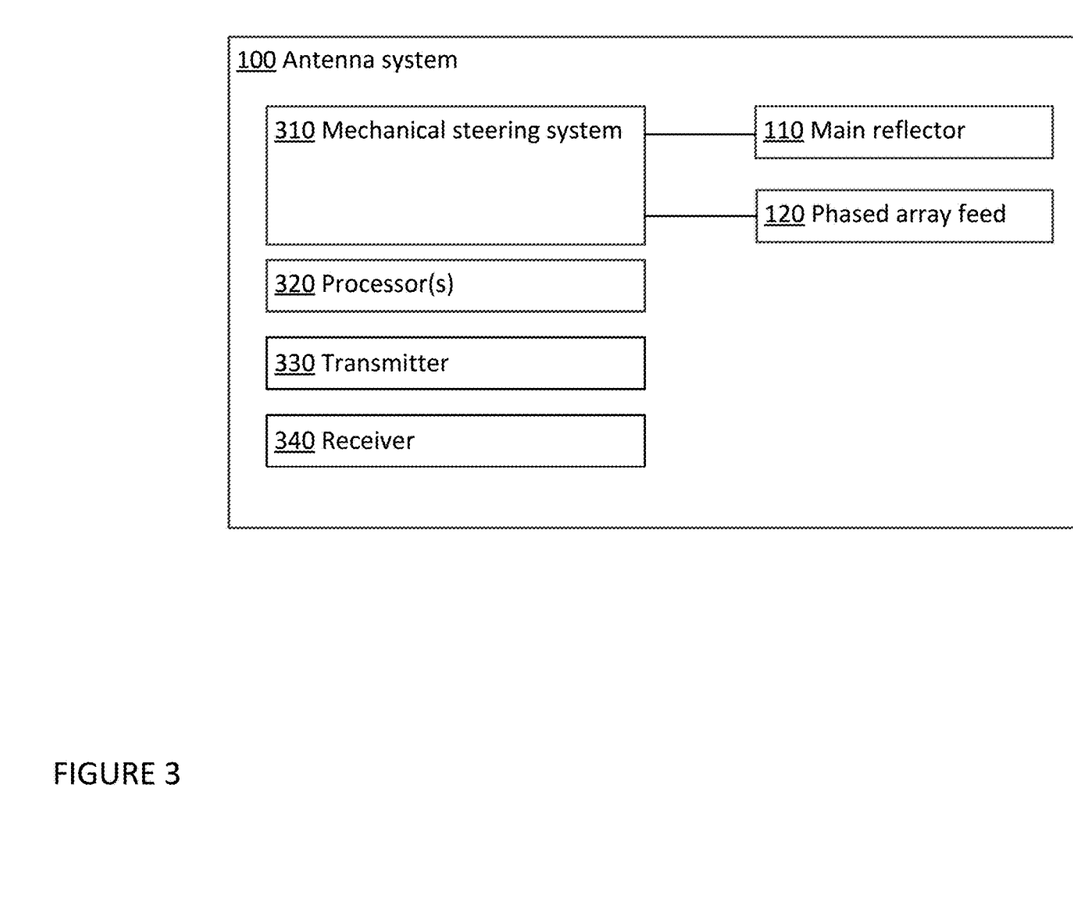
FIG. 3 is a functional diagram of the example antenna system of FIG. 1 in accordance with aspects of the disclosure.

As shown in FIG. 3, main parabolic reflector 110 and phased array feed 120 are coupled to a mechanical steering system 310. The antenna system 100 further includes one or more processors 320 coupled to mechanical steering system 310, one or more transmitters 330, and one or more receivers 340. The one or more processors 320 may be any conventional processors, such as commercially available CPUs or may be a dedicated device such as an ASIC or other hardware-based processor. In addition, the one or more processors 320 are configured to operate the antenna system 100, including transmitting signals via transmitter 330, receiving signals via receiver 340, and moving main parabolic reflector 110 and phased array feed 120 via mechanical steering system 310. The transmitter 330 may be, for example, a radio frequency power amplifier coupled to a transmitting antenna. The receiver 340 may be, for example an antenna coupled to a radio frequency receiver. In some implementations, the antenna system 100 may be a transmit-only system, in which case the antenna system 100 includes one or more transmitters 330 and no receivers. The antenna may alternatively be a receive-only system that includes only one or more receivers 340 and no transmitters.

Figure 4:
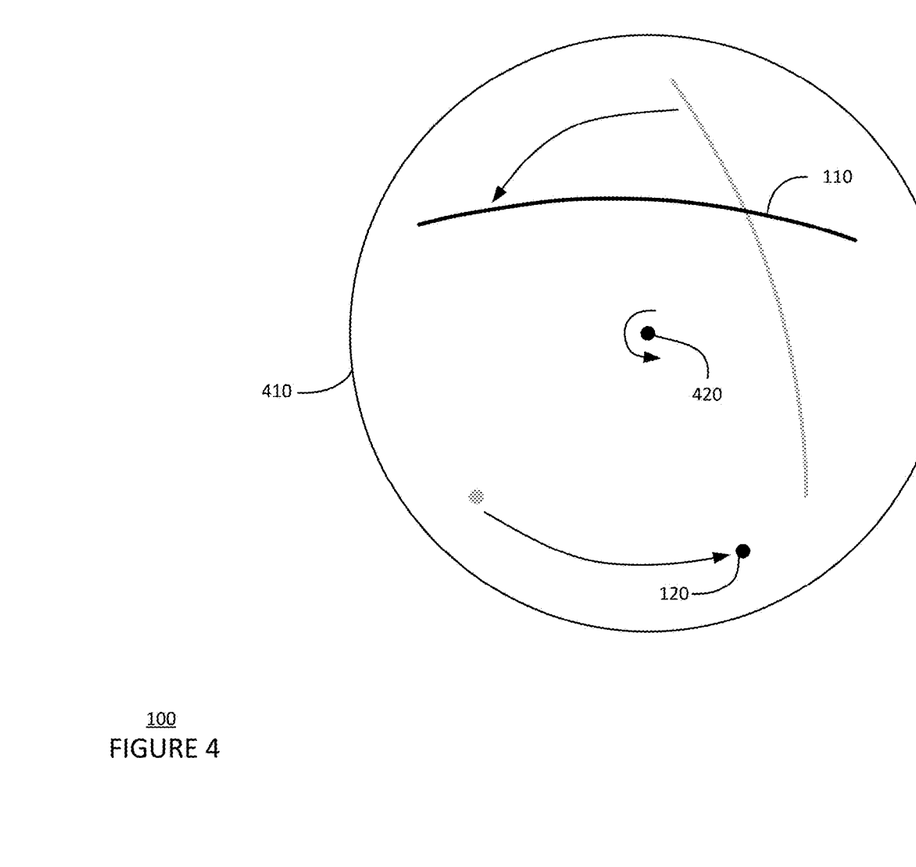
FIG. 4 is a top-down view of another example antenna system in accordance with aspects of the disclosure.

With reference to FIG. 4, the mechanical steering system 310 of the antenna system 100 may, for example, include a turntable. The turntable may be configured to rotate about a turntable axis, such as at least 10 degrees, 180 degrees, or other number of degrees. As shown in FIG. 4, the main parabolic reflector 110 and the phased array feed 120 is mounted on turntable 410 with the phased array feed 120 positioned on the turntable at a focus of the main parabolic reflector 110. To move the antenna system 100, the one or more processors 320 may be configured to turn turntable 410 about a turntable axis 420. As the turntable 410 is rotated counterclockwise about turntable axis 420, main parabolic reflector 110 and phased array feed 120 also is rotated counterclockwise about turntable axis 420. The relative positions of parabolic reflector 110 and phased array feed 120 remains fixed when turntable 410 is turned. In other implementations, the turntable axis may be collinear with the phased array feed 120, in which case, the phased array feed is configured to rotate in place while the main parabolic reflector 110 rotates.

Figure 5:
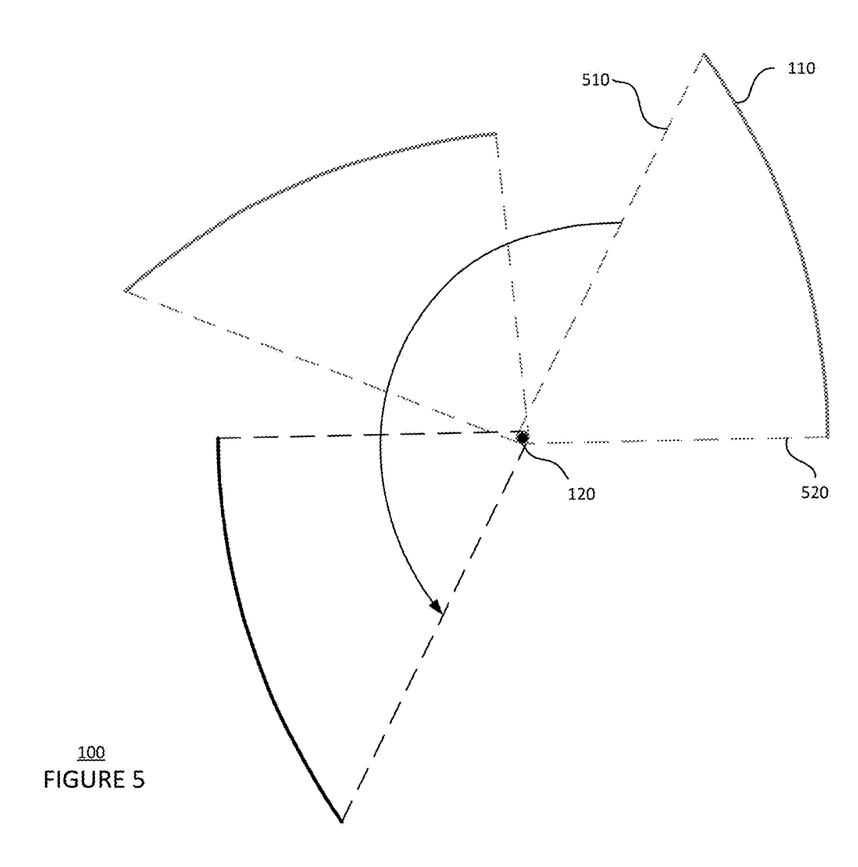
FIG. 5 is a top-down view of a further example antenna system in accordance with aspects of the disclosure.

With reference to FIG. 5, in other examples, the mechanical steering system 310 of the antenna system 100 may include one or more arms 510. As shown in FIG. 5, the main parabolic reflector 110 is attached to or around the phased array feed 120 by the one or more arms 510, 520. In this particular embodiment of antenna system 100, an arm, e.g., 510 or 520, extends between an edge of the main parabolic reflector 110 to the surface of the phased array feed 120 or a location near the surface of the phased array feed 120. The one or more processors 320 may be configured to rotate the antenna system 100 about an axis that is collinear with phased array feed 120. Therefore, phased array feed 120 either remains stationary or may be rotated in place while the main parabolic reflector 110 is rotated.

The antenna system may also include at least one additional array feed or feed element arranged adjacent to the phased array feed. When there are two additional array feeds or feed elements, the additional array feeds or feed elements may be positioned, for instance, to the left and to the right of the main phased array feed, thereby forming a plane perpendicular to the vertex or axis of symmetry of the parabolic reflector. The additional array feeds or feed elements may be configured to receive the signal being reflected off the main parabolic reflector. In this regard, the one or more processors 320 of the antenna system may be configured to determine whether and where the signal is being received mostly at the additional array feeds or feed elements and determine an adjustment to the antenna system based on where the signal is being received in order to cause the signal to be reflected mostly onto the main phased array feed.

Figure 6A:
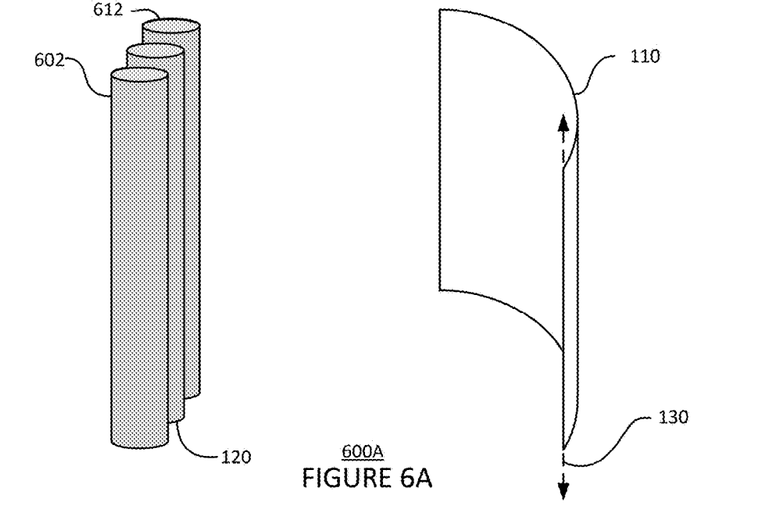
FIGS. 6A and 6B are perspective views of example antenna systems in accordance with aspects of the disclosure.

In one embodiment, an example antenna system 600A described in FIG. 6A may include a left array feed 602 and a right array feed 612 arranged to the left and right of main phased array feed 120, respectively, from the perspective of the vertex 130 of the main parabolic reflector 110. These additional arrays, left array feed 602 and right array feed 612, can be used for early and late signal tracking, or rather determining whether the signal is slightly off from the main phased array feed 120. The use of these additional arrays provides for a higher antenna gain and a more reliable tracking signal. However, using two additional array feeds may require a significant number of additional feed elements which can make such a system expensive to construct.

Figure 6B:
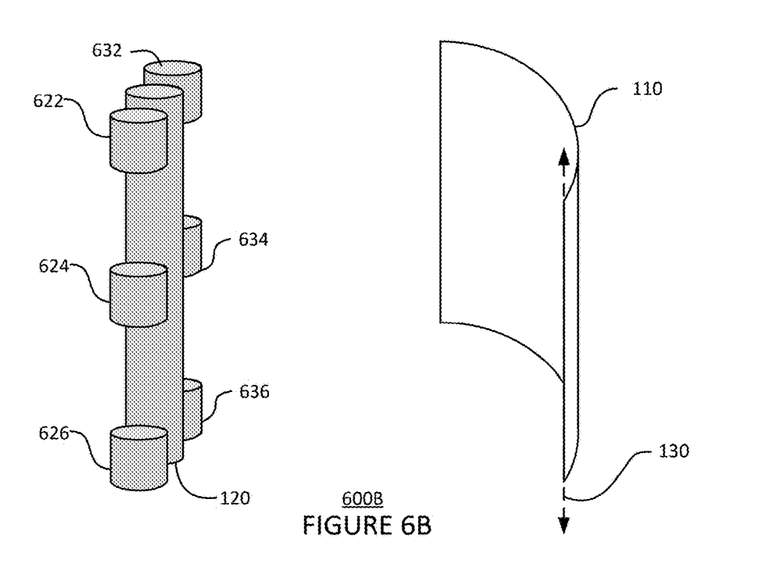

In another embodiment, an example antenna system 600B described in FIG. 6B may include left feed elements 622, 624, 626 arranged to the left of main phased array feed 120 from the perspective of the vertex 130 of the main parabolic reflector 110, and right feed elements 632, 634, 636 arranged to the right of the main phased array feed from the perspective of the vertex of the main parabolic reflector. Unlike in the example antenna system 600A, the additional feed elements do not form a complete linear array and hence do not provide antenna gain. Therefore, the early and late tracking signal may be weaker and in some examples less reliable, but the tracking signal can still be useful as a lower signal to noise ratio (SNR) is required for tracking as opposed to data communication via the main phased antenna array feed 120. However, because the additional feed elements do not form a complete linear array, many less additional feed elements are required for example antenna system 600B than for example antenna system 600A. Thus, example antenna system 600B may be less expensive to construct than example antenna system 600A.

In other examples, an antenna system may include multiple phased array feeds and parabolic reflectors. For instance, the antenna system may include a first and a second parabolic reflector and a first and a second phased array feed. The first parabolic reflector and the first phased array feed may be used for transmitting signals, and the second parabolic reflector and the second phased array feed may be used for receiving signals. The first parabolic reflector and the first phased array feed may be arranged aligned with the second parabolic reflector and the second phased array feed, respectively.

Figure 7:
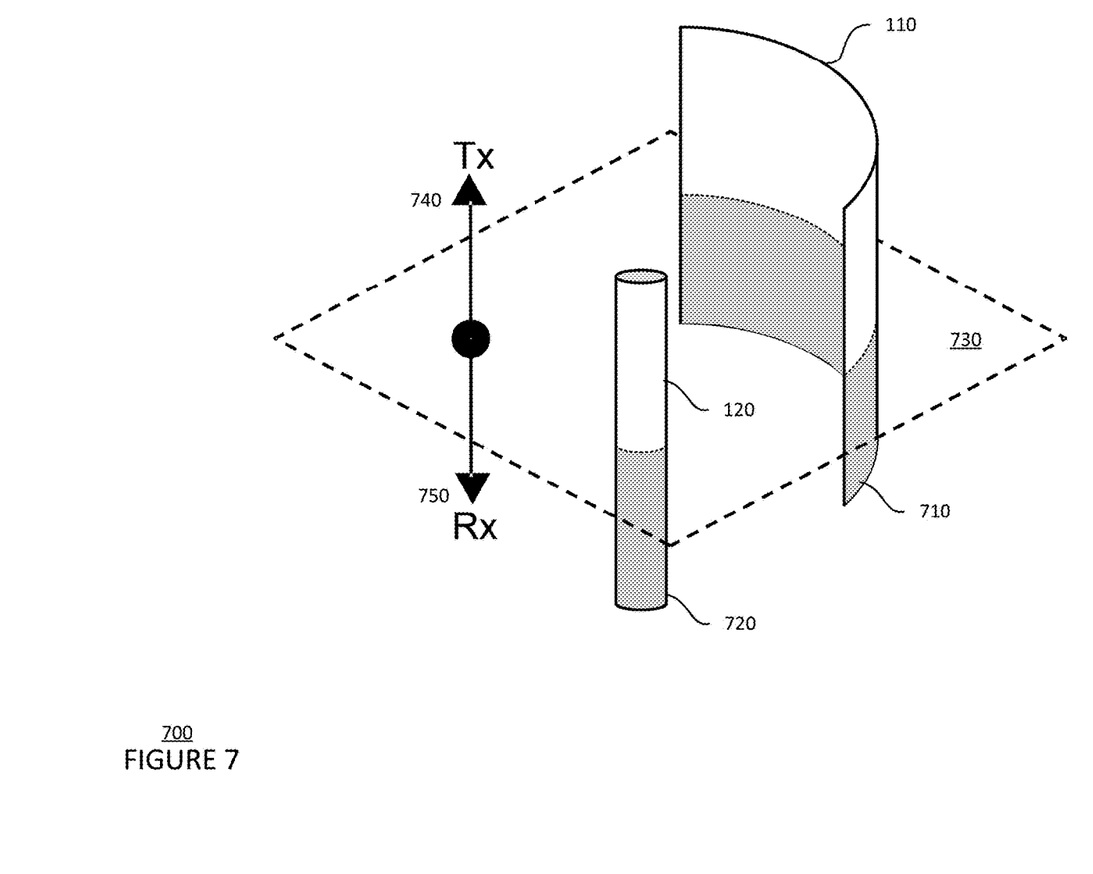
FIG. 7 is a perspective view of another example antenna system in accordance with aspects of the disclosure.

As shown in example antenna system 700 of FIG. 7, main parabolic reflector 110 is a transmitting parabolic reflector 110, and phased array feed 120 is a transmitting phased array feed 120 arranged as shown in the example of FIG. 1. A receiving parabolic reflector 710 is positioned below and in alignment with the transmitting parabolic reflector 110, and a receiving phased array feed 720 is positioned below and in alignment with the transmitting phased array feed 120. In some alternative examples, the transmitting parabolic reflector 110 and the receiving parabolic reflector 710 may actually be two portions of a single reflector. As a result, the receiving parabolic reflector 710 and the receiving phased array feed 720 are also arranged with respect to one another as shown in the example FIG. 1. The antenna system 700 therefore has an imaginary dividing plane 730 that splits the system into a transmitting system 740 above the dividing plane and a receiving system 750 below the dividing plane 730. As shown in the illustration of FIG. 7, transmitting parabolic reflector 110 and transmitting phased array feed 120 are adjacent to receiving parabolic reflector 710 and receiving phased array feed 720, though in other implementations there may be a space in between.

The transmitting system 740 and the receiving system 750 may be configured to move together. In this way, the transmitting system and the receiving system are always oriented or pointed in the same direction and therefore may establish two-way communication with a particular location via the antenna system 700. The antenna system may include a radio-frequency absorption foam at the imaginary dividing plane 730 to prevent interference with the transmitted and received signals.

Furthermore, the antenna system 100 or 700 may perform frequency-division duplexing. In other words, the one or more processors may be configured to operate the receiver and the transmitter at different frequency bands. Alternatively, the antenna system 100 or 700 may utilize a single linear array feed and reflector system for both transmitting and receiving signals by alternating the status of the system between a transmitting status and a receiving status, such as in a time-division duplex mode.

Figure 8:
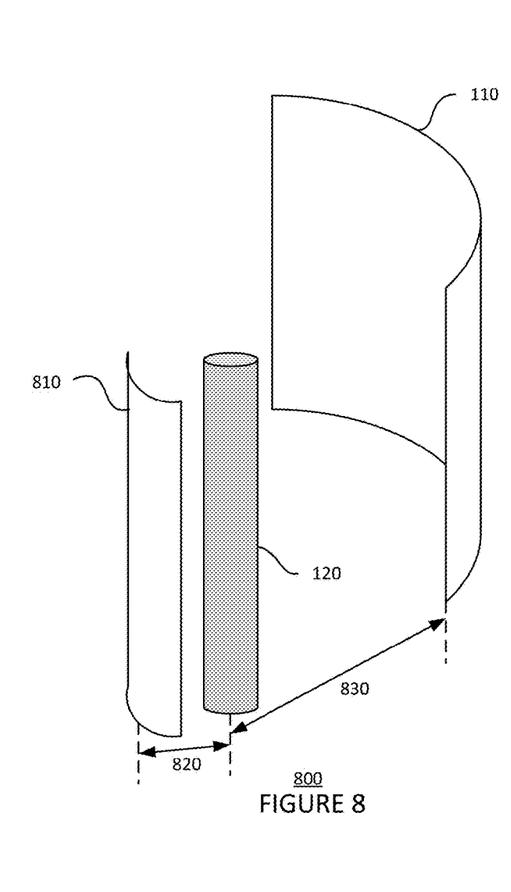
FIG. 8 is a perspective view of yet another example antenna system in accordance with aspects of the disclosure.

Additionally, an antenna system may include a back reflector arranged on the side of the phased array feed opposite the main parabolic reflector. As shown in FIG. 8, example antenna system 800 includes main reflector 110 and phased array feed 120, as in the example of FIG. 1, and further includes a back reflector 810. The back reflector 810 is curved to wrap around the phased feed array 120 and direct a transmitted signal and/or a received signal toward the main parabolic reflector 110. The back reflector 810 is arranged a distance 820 from the phased array feed 120 that is shorter than the distance 830 between the phased array feed 120 and the main parabolic reflector 110. When the main parabolic reflector 110 is rotated, the back reflector 810 may be configured to rotate with the main parabolic reflector 110 so that the back reflector 810 is always facing the main parabolic reflector 110. For example, the back reflector 810 may be mounted on a turntable opposite the main parabolic reflector 110 so that the back reflector 810 rotates with the rest of the elements on the turntable. In other examples, the back reflector 810 may be attached to the phased array feed 120 and/or the main parabolic reflector 110 by one or more arms that keep the relative position of the back reflector 810 to the phased array feed 120 and the main parabolic reflector 110 fixed when the antenna system is rotated.

Alternatively, the parabolic reflector 110 may be a two dimensional parabolic dish. The phased array feed for a parabolic dish reflector includes a plurality of phased array elements arranged at and around the focal point of the paraboloid dish.

In a further alternative embodiment, a lens antenna may be used instead of the parabolic reflector to provide fixed gain, with the phased array feed at or near the focus of the lens. A received signal may enter the lens at an outer surface of the lens and pass through the lens and through the inner surface of the lens proximal to the phased array feed and be received at the phased array feed.

Figure 9:
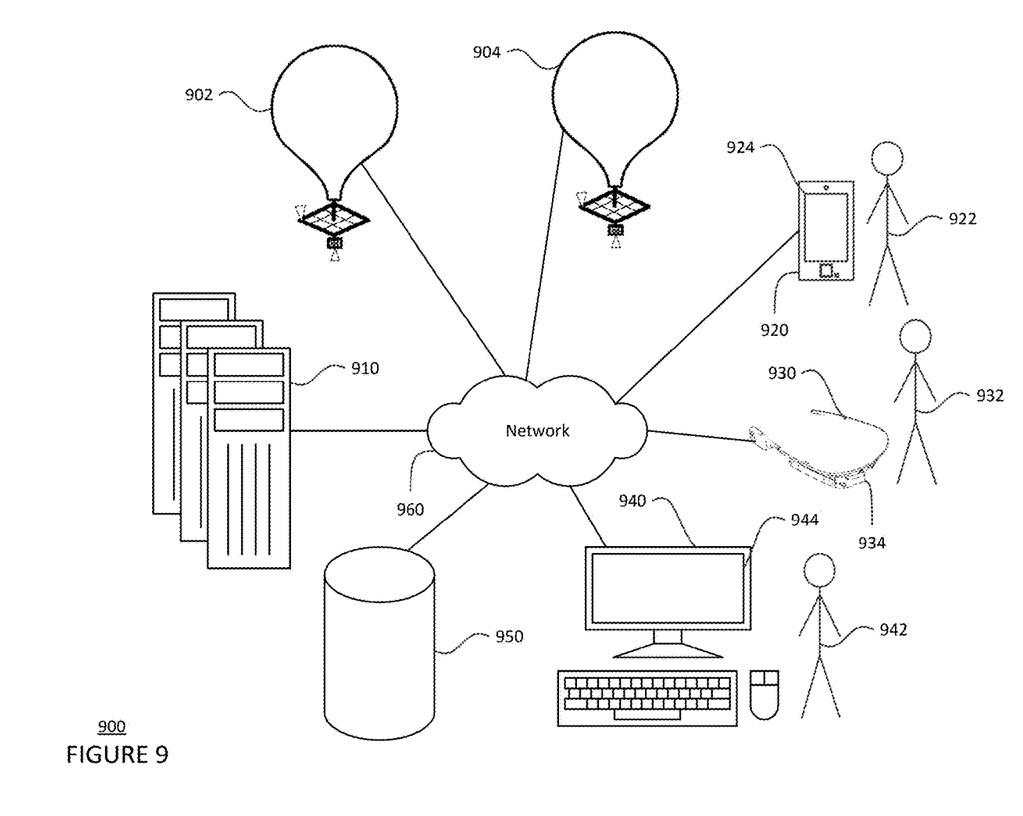
FIG. 9 is a functional diagram of an example network in accordance with aspects of the disclosure.
Figure 10:
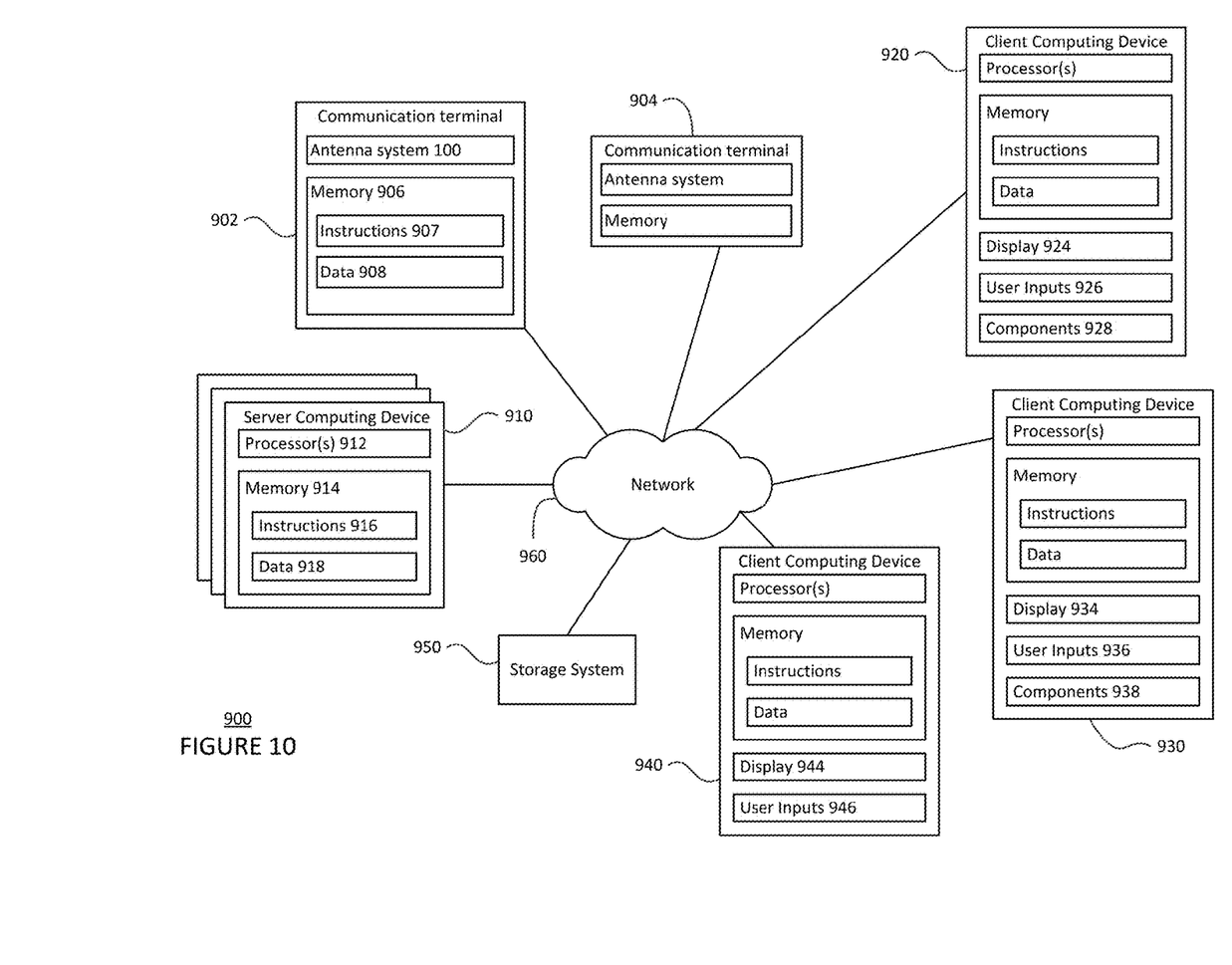
FIG. 10 is a pictorial diagram of the example network of FIG. 9 in accordance with aspects of the disclosure.

FIGS. 9 and 10 show an example system 900 in which the antenna system 100, 700, or 800 may be used. The antenna system may be incorporated in a communication terminal such as communication terminals 902 and 904. The communication terminals 902, 904 may also include a memory 906 that stores information accessible by the one or more processors 320, including instructions 907 and data 908 that may be executed or otherwise used by the processor 320.

The instructions 907 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance.

The data 908 may be retrieved, stored or modified by processor 320 in accordance with the instructions 907. For instance, although the claimed subject matter is not limited by any particular data structure, the data may be stored in computing device registers, in a relational database as a table having a plurality of different fields and records, XML documents or flat files. The data may also be formatted in any computing device-readable format.

The example system 900 includes a plurality of communication terminals such as, for example, communication terminals 902 and 904, a plurality of computing devices 910, 920, 930, 940, and a storage system 950 connected via a network 960. Although only a few computing devices are depicted for simplicity, a typical system may include significantly more.

As shown in FIG. 9, each of computing devices 910, 920, 930, 940 may include one or more processors, memory, data and instructions. Such processors, memories, data and instructions may be configured similarly to one or more processors 320, memory 906, instructions 907, and data 908 of communication terminal 902.

The network 960, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, Wi-Fi and HTTP, and various combinations of the foregoing. The network 960 may also include long range communication protocols, such as high rate radio communication. Such communication may be facilitated by any device capable of transmitting data to and from other computing devices, such as modems and wireless interfaces.

In addition, server computing devices 910 may use network 960 to transmit and present information to a user, such as user 922, 932, 942 on a display, such as displays 924, 934, 942 of computing devices 920, 930, 940. In this regard, computing devices 920, 930, 940 may be considered client computing devices.

As shown in FIG. 9, each client computing device 920, 930, 940 may be a personal computing device intended for use by a user 922, 932, 942, and have all of the components normally used in connection with a personal computing device including a one or more processors (e.g., a central processing unit (CPU)), memory (e.g., RAM and internal hard drives) storing data and instructions, a display such as displays 924, 934, 944 (e.g., a monitor having a screen, a touch-screen, a projector, a television, or other device that is operable to display information), and user input devices 926, 936, 946 (e.g., a mouse, keyboard, touch screen or microphone). The client computing devices may also include a camera for recording video streams, speakers, a network interface device, and all of the components used for connecting these elements to one another.

In addition, the client computing devices 920 and 930 may also include components 928 and 938 for determining the position and orientation of client computing devices. For example, these components may include a GPS receiver to determine the device's latitude, longitude and/or altitude as well as an accelerometer, gyroscope or another direction/speed detection device.

Although the client computing devices 920, 930, and 940 may each comprise a full-sized personal computing device, they may alternatively comprise mobile computing devices capable of wirelessly exchanging data with a server over a network such as the Internet. By way of example only, client computing device 920 may be a mobile phone or a device such as a wireless-enabled PDA, a tablet PC, a wearable computing device or system, or a netbook that is capable of obtaining information via the Internet or other networks. In another example, client computing device 930 may be a wearable computing system, shown as a head-mounted computing system in FIG. 10. As an example the user may input information using a small keyboard, a keypad, microphone, using visual signals with a camera, or a touch screen.

Storage system 950 may store various types of information that may be retrieved or otherwise accessed by a server computing device, such as one or more server computing devices 910, in order to perform some or all of the features described herein. The storage system 950 may store data and communications received at communication terminals 902, 904.

As with memory 930, storage system 950 can be of any type of computerized storage capable of storing information accessible by the server computing devices 910, such as a hard-drive, memory card, ROM, RAM, DVD, CD-ROM, write-capable, and read-only memories. In addition, storage system 950 may include a distributed storage system where data is stored on a plurality of different storage devices which may be physically located at the same or different geographic locations. Storage system 950 may be connected to the computing devices via the network 960 as shown in FIG. 10 and/or may be directly connected to or incorporated into any of the computing devices 910, 920, 930, 940, communication terminals 902, 904, etc.

Example Methods

Figure 11:
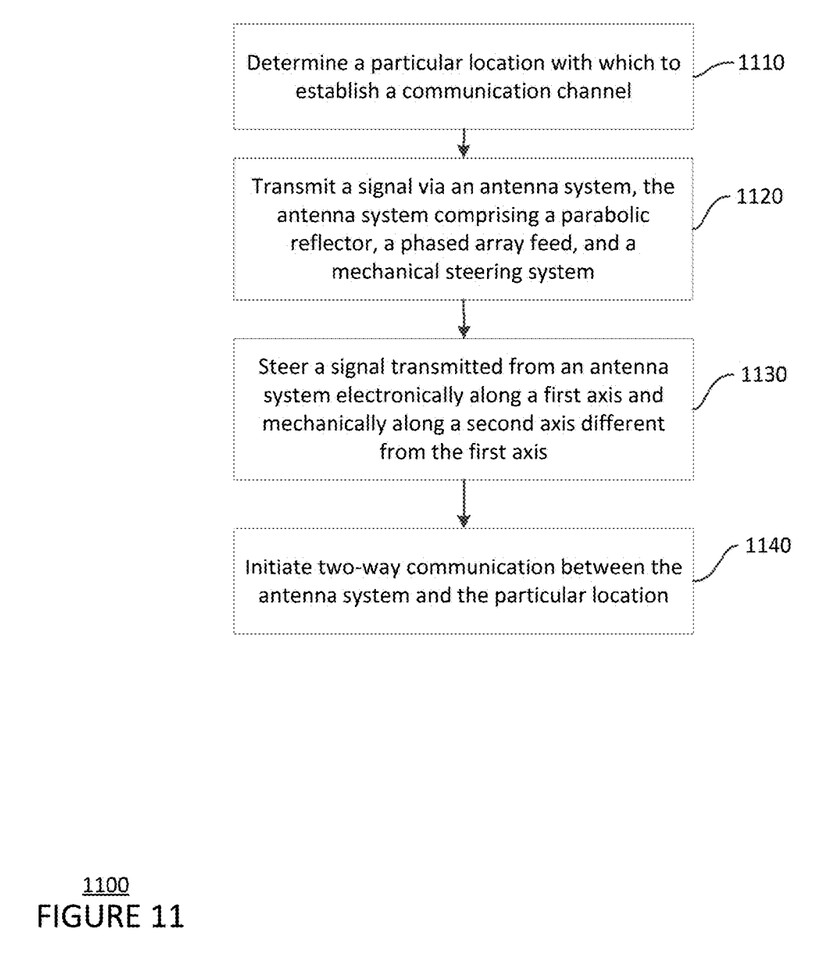
FIG. 11 an example flow diagram in accordance with aspects of the disclosure.

FIG. 11 is an example flow diagram 1100 in accordance with some of the aspects described above that may be performed by one or more processors 320. While FIG. 11 shows blocks in a particular order, the order may be varied and that multiple operations may be performed simultaneously. Also, in some embodiments, operations may be added or omitted.

The antenna system 100, 700, or 800 may be used to establish a two-way communication channel with a particular location. As described above, the antenna system 100, 700, or 800 includes a main reflector, a phased array feed in a fixed position relative to the main reflector, and a mechanical steering system. At block 1110, the one or more processors may be configured to determine a particular location with which to establish a communication channel. The location may be determined by detecting a signal from another antenna system at the particular location, receiving location information for the particular location at the one or more processors from the detected signal, or retrieving stored location information for the particular location from a memory.

At block 1120, the one or more processors may transmit a signal via an antenna system, the antenna system comprising a parabolic reflector, a phased array feed, and a mechanical steering system. Then, the one or more processors may steer the transmitted signal transmitted electronically and mechanically to point in the direction of the particular location at block 1130. The one or more processors may cause the phased array feed to electronically steer the transmitted signal on the first axis via the transmitter, and may cause the antenna system to mechanically steer the transmitted signal along the second axis by controlling the mechanical steering system. The desired signal steering direction is thus decomposed into the mechanical and electronic steering axes.

After the transmitted signal is pointed in the direction of the particular location, a two-way communication between the antenna system and the particular location may be initiated using the one or more processors at block 1130. Communications and data may be transmitted to and received from the particular location via the transmitter and receiver of the antenna system.

In some examples, the one or more processors may further adjust a position of the antenna system based on received signals to establish the two-way communication channel with the particular location. Received signals may be detected mostly by one of the additional array feeds or feed elements, and the one or more processors may be configured to determine where on the additional array feeds or feed elements the signal is mostly received. The determined feed location on the additional array feed or feed elements where the signal is mostly received may be a feed location having a highest amount of received signal. The amount of signal received on the feed elements to the left and right side of the main phased array feed may be compared with the amount of signal received by the main phased array feed to generate an error signal. The comparison of the left and right feeds may be a power comparison, a signal phase comparison, a combination of the two, or any other type of signal comparison.

For instance, for the power comparison, the signal may be detected mostly by one of the additional array feeds or feed elements when a higher amount of gain is caused at the additional array feeds or feed elements than at the main feed array. The signal may be focused mostly on the main phased array feed when a higher amount of gain is caused at the main phased array feed than at the additional array feed or feed elements. In some implementations, focusing the signal may be performed to receive a highest amount of gain possible from the received signal at the main phased array feed. The signal phase comparison may be similarly performed.

Based on the determined feed location on the additional array feeds or feed elements and where the determined feed location is in relation to the main phased array feed, the one or more processors may determine an adjustment. The adjustment may be determined based on reducing the generated error signal to zero or close to zero. The adjustment may include a direction and a distance to move the antenna system so that the received signals may be received at the main phased array feed. In addition, the adjustment may also be determined based on location information received from a signal from the particular location, which may be updated at intervals or continuously. The one or more processors may then move the antenna system based on the determined adjustment using the mechanical steering system and/or electronically steer the received signal based on the determined adjustment. In some implementations, the adjustment may be determined by the one or more processors using closed-loop feedback from the phased array feed.

The features described herein provide antenna systems that may operate and adjust faster using lower precision (and hence lower cost and/or lower weight) mechanical steering than prior systems. As a result, the antenna systems described herein may establish a more reliable and stronger communication channel that allows users to be able to access a network and information on the network quicker and easier. The features also allow for an expanded network of antenna systems that is able to reach longer distances so that users are able to gain network access in remote areas. Unless otherwise stated, the foregoing alternative examples are not mutually exclusive, but may be implemented in various combinations to achieve unique advantages.

As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An antenna system comprising:
a main reflector;
a phased array feed configured to receive or transmit signals off the main reflector and to electronically steer a transmitted signal on a first axis; and
a mechanical steering system to which the main reflector and the phased array feed are attached, the mechanical steering system being configured to move the transmitted signal along a second axis.

2. The antenna system of claim 1, wherein the main reflector is a parabolic cylinder, the parabolic cylinder being linear in one dimension and parabolic in a second dimension.

3. The antenna system of claim 2, wherein the phased array feed is a linear phased array positioned along a linear focus of the main reflector.

4. The antenna system of claim 1, wherein the first axis is vertical, and the second axis is horizontal.

5. The antenna system of claim 1, further comprising a back reflector positioned proximal to the phased array feed on a side of the phased array feed opposite the main reflector.

6. The antenna of claim 5, wherein the position of the back reflector relative to the main reflector remains fixed when the mechanical steering system moves the transmitted signal along the second axis.

7. The antenna system of claim 1, wherein the mechanical steering system includes a turntable configured to rotate about a turntable axis.

8. The antenna system of claim 1, wherein the phased array feed is configured to remain stationary when the mechanical steering system moves the transmitted signal along the second axis.

9. The antenna system of claim 1, wherein the mechanical steering system includes one or more arms extending between the main reflector and the phased array feed.

10. The antenna of claim 9, wherein the mechanical steering system includes one or more arms extending between the main reflector and the back reflector.

11. The antenna of claim 1, further comprising at least two additional feed elements, a first additional feed element being positioned on a first side of the phased array feed and a second additional feed element being positioned on a second side of the phased array feed opposite the first side.

12. The antenna system of claim 11, wherein the first and second additional feed elements are configured to receive a signal; and
wherein the antenna system is configured to adjust the antenna system based on the received signal in order to cause the received signal to be reflected onto the phased array feed more than onto the first and second additional feed elements.

13. The antenna system of claim 11, wherein the at least two additional feed elements comprises two linear phased arrays.

14. The antenna system of claim 1, wherein the main reflector is a first main reflector, and the phased array feed is a first phased array feed; and
the antenna further comprises:
a second main reflector positioned in alignment with the first main reflector, and
a second phased array feed positioned in alignment with the first phased array feed.

15. The antenna system of claim 14, further comprising an insulating foam between the first phased array feed and the second phased array feed.

16. A method comprising:
determining, by one or more processors, a particular location with which to establish a communication channel;
transmitting, by the one or more processors via an antenna system, a signal, the antenna system comprising a main reflector, a phased array feed, and a mechanical steering system;
steering, by the one or more processors, the transmitted signal electronically along a first axis using a phased array feed and mechanically along a second axis using a mechanical steering system; and
initiating, by the one or more processors, two-way communication between the antenna system and the particular location.

17. The method of claim 16, wherein the phased array feed is a linear phased array positioned along a linear focus of the main reflector.

18. The method of claim 16, wherein the first axis is vertical, and the second axis is horizontal.

19. The method of claim 16, wherein mechanically steering the transmitted signal includes controlling the mechanical steering system, the mechanical steering system comprising a turntable configured to rotate about a turntable axis or one or more arms extending between the main reflector and the phased array feed.

20. The method of claim 16, further comprising adjusting, by the one or more processors, a position of the antenna system by:
receiving, via the phased array feed and one or more additional feed elements arranged proximal to the phased array feed, one or more signals;
determining feed locations on the phased array feed and the one or more additional feed elements where the one or more signals is received;
determining an adjustment based on the determined feed locations; and
moving, using the mechanical steering system, the antenna system according to the determined adjustment.

* * * * *

UNITED STATES PATENT AND TRADEMARK OFFICE
CERTIFICATE OF CORRECTION

PATENT NO. : 10,177,434 B1
APPLICATION NO. : 15/852775
DATED : January 8, 2019
INVENTOR(S) : Sundararajan Sriram, Simon Scott and Jeffrey M. Gilbert It is certified that error appears in the above-identified patent and that said Letters Patent is hereby corrected as shown below:

In the Claims

Claim 6, Column 11, Line 45:
Now reads: "The antenna of"; should read -- The antenna system of --

Claim 10, Column 11, Line 60:
Now reads: "The antenna of"; should read -- The antenna system of --

Claim 10, Column 11, Line 62:
Now reads: "the back reflector"; should read -- a back reflector --

Claim 11, Column 11, Line 63:
Now reads: "The antenna of"; should read -- The antenna system of --

Signed and Sealed this
Eighth Day of February, 2022

Drew Hirshfeld
*Performing the Functions and Duties of the
Under Secretary of Commerce for Intellectual Property and
Director of the United States Patent and Trademark Office*